Patented Dec. 14, 1937

2,101,994

UNITED STATES PATENT OFFICE 2,101,994

PREPARATION OF CELLULOSE ACETATE PROPIONATE BUTYRATE

Charles R. Fordyce, Rochester, N. Y., assignor, by mesne assignments, to Eastman Kodak Company, Jersey City, N. J., a corporation of New Jersey No Drawing. Application June 26, 1936, Serial No. 87,450

4 Claims. (Cl. 260—101)

The present invention relates to the preparation of cellulose acetate propionate butyrate in which cellulose is presoaked with a mixture of acetic and propionic acids containing 25-90% of propionic acid followed by esterification with a reaction mixture containing a substantial amount of butyric anhydride.

Cellulose acetate propionate, having a high propionyl content, exhibits a much wider range of solubility in organic solvents than either cellulose acetate or cellulose acetate propionate having a low propionyl content. Cellulose acetate butyrate, having a high butyryl content, has a still wider range of solubility in organic solvents than the cellulose acetate propionate and, in addition, is compatible with large amounts of natural or synthetic resins and may be dissolved in solvents similar to those employed in working cellulose nitrate.

Cellulose acetate butyrate of high butyryl content has the disadvantage, however, that it is difficult to prepare from ordinary undegraded cellulosic material, such as cotton or refined high alpha cellulose wood pulp. I have found that the pretreatment of the cellulose in the presence of butyric acid which is very desirable in preparing high butyryl cellulose acetate butyrate does not give as reactive a form of cellulose as is obtained by presoaking with acetic acid or a mixture of acetic and propionic acid.

I have found that the advantages of cellulose acetate butyrate of high butyryl content are also present in a cellulose acetate propionate butyrate having a high content of propionyl or butyryl. I have found that this ester may be satisfactorily prepared if the cellulose is first presoaked with a mixture of acetic and propionic acids which mixture contains 25-90% propionic acid followed by esterification with butyric anhydride. The resulting product has high uniformity and is substantially free from haze and unacetylated impurities. This product is superior in these respects to a product in which the cellulose is not subjected to presoaking in accordance with my invention or with a presoaking bath substantially consisting of acetic acid. The following examples illustrate the preparation of cellulose acetate propionate butyrate in accordance with my invention:

Example I 100 parts of cotton linters were presoaked for 4 hours at 150° F. with a mixture of 460 parts of propionic acid and 140 parts of acetic acid. The mixture was then cooled to 50° F. and esterification was started by the addition of 400 parts of butyric anhydride containing 7.4 parts of sulfuric acid. After a homogeneous solution was obtained, the excess anhydride in the reaction mixture was destroyed by the addition of 70% aqueous acetic acid. The mixture was then maintained at 100° F. for 4 hours after which it was precipitated in water, washed free from acid and dried. The resulting product contained 14% acetyl, 19% propionyl and 18% butyryl. It was soluble in benzol at ordinary temperatures.

If desired, an excess of 70% acetic acid over that necessary to kill the anhydride may be added and the product may then be hydrolyzed by holding the mixture at 100° F. for the time desired, depending upon the degree to which the hydrolysis is to be carried.

Example II 100 parts of cotton linters were presoaked for 4 hours at 150° F. with a mixture of 150 parts of acetic acid and 100 parts of propionic acid. The mixture was cooled to 70° F. and esterification was started by the addition of 400 parts of butyric anhydride containing 7.4 parts of sulfuric acid. After the mass became homogeneous, the excess anhydride in the reaction mixture was destroyed by the addition of 70% aqueous acetic acid. The mixture was then maintained at 100° F. for 4 hours after which it was precipitated in water, washed free from acid and dried. The resulting product contained 13% acetyl, 7% propionyl and 35% butyryl.

The proportion of acetic and propionic acids in the presoaking of the cellulose, in accordance with my invention, is determined by the proportion of propionyl groups desired in the finished product. In the first example, the amount of propionic acid employed is a fraction over three times that of the acetic acid used in the presoaking. The amount of presoaking obtained by this treatment is quite satisfactory and these proportions suppress the proportion of acetyl which will be finally present in the ester. The second example shows that larger proportions of acetic acid may be used. If desired, as much as 75% of acetic acid might be employed in the presoaking. This would give a very effective swelling action on the cellulose so that the subsequent esterification would readily take place, however, with these proportions the amount of acetyl present in the resulting ester would be quite high.

The product of my invention is eminently suitable for various types of plastic compositions, the ester being especially useful because of its compatibility with organic compounds, such as resins and solvents. Due to the great uniformity and clarity of the product resulting in the process of my invention, the cellulose acetate propionate butyrate prepared thereby is suitable for use where high standards are required, such as in the making of photographic film, laminated glass, yarn, molded products and the like.

I claim:

1. A process for preparing cellulose acetate propionate butyrate having a greatly predominating content of butyryl groups which comprises presoaking cellulose with a mixture of acetic and propionic acids containing 25–90% propionic acid followed by esterification of the cellulose induced by the addition of a mixture essentially consisting of butyric anhydride and an acylation catalyst thereto.

2. A process for preparing cellulose acetate propionate butyrate having a greatly predominating content of butyryl groups which comprises presoaking cellulose with a mixture of acetic and propionic acids containing 25–90% of propionic acid, esterifying by adding a mixture essentially consisting of butyric anhydride and an acylation catalyst thereto and then hydrolyzing the resulting ester until a product having the desired acyl content is obtained.

3. A process for preparing cellulose acetate propionate butyrate having a greatly predominating content of butyryl groups which comprises presoaking cellulose with a mixture of acetic and propionic acids containing approximately 75% of propionic acid followed by esterification of the cellulose induced by the addition of a mixture essentially consisting of butyric anhydride and an acylation catalyst thereto.

4. A process for preparing cellulose acetate propionate butyrate having a greatly predominating content of butyryl groups which comprises presoaking 100 parts of cellulose with 600 parts of a mixture of acetic and propionic acids containing 25–90% propionic acid and then adding a mixture essentially consisting of 400 parts of butyric anhydride and 7.4 parts of an acylation catalyst thereto causing esterification of the cellulose.

CHARLES R. FORDYCE.